United States Patent [19]

Josefiak et al.

[11] Patent Number: 4,725,080
[45] Date of Patent: Feb. 16, 1988

[54] REMOTELY OPERATED PIPE CONNECTOR

[75] Inventors: Leonard J. Josefiak, Scotia; Charles E. Cramer, Guilderford, both of N.Y.

[73] Assignee: The United States of America as represented by the Department of Energy, Washington, D.C.

[21] Appl. No.: 844,444

[22] Filed: Mar. 26, 1986

[51] Int. Cl.⁴ ............................................. F16L 35/00
[52] U.S. Cl. ...................................... 285/24; 285/39; 285/367; 285/920
[58] Field of Search .................. 285/18, 24, 27, 39, 285/367, 920; 29/238

[56]    References Cited
U.S. PATENT DOCUMENTS

| | | | |
|---|---|---|---|
| 2,866,370 | 12/1958 | Biach | 285/18 X |
| 3,216,746 | 11/1965 | Watts | 285/367 X |
| 3,220,245 | 11/1965 | Van Winkle | 285/367 X |
| 3,403,931 | 10/1968 | Crain et al. | |
| 3,680,188 | 8/1972 | Mason et al. | |
| 3,754,780 | 8/1973 | Pogonowski | |
| 3,804,288 | 4/1974 | Piegza | 285/24 X |
| 3,843,168 | 10/1974 | Morrill et al. | 285/24 |
| 3,845,973 | 11/1974 | Houot | |
| 4,019,334 | 4/1977 | Sinclair et al. | 285/18 |
| 4,150,477 | 4/1979 | Orr | 285/18 X |
| 4,185,856 | 1/1980 | McCaskill | |
| 4,191,256 | 3/1980 | Coy et al. | |

OTHER PUBLICATIONS

Engineering Material and Design, vol. 21, No. 7, Jul. 1977, p. 16.

*Primary Examiner*—Dave W. Arola
*Attorney, Agent, or Firm*—Earl T. Reichert; Judson R. Hightower; Richard E. Constant

[57]    ABSTRACT

An apparatus for remotely assembling and disassembling a Graylock type connector between a pipe and a closure for the pipe includes a base and a receptacle on the base for the closure. The pipe is moved into position vertically above the closure by a suitable positioning device such that the flange on the pipe is immediately adjacent and concentric with the flange on the closure. A moving device then moves two semicircular collars from a position free of the closure to a position such that the interior cam groove of each collar contacts the two flanges. Finally, a tensioning device automatically allows remote tightening and loosening of a nut and bolt assembly on each side of the collar to cause a seal ring located between the flanges to be compressed and to seal the closure. Release of the pipe and the connector is accomplished in the reverse order. Preferably, the nut and bolt assembly includes an elongate shaft portion on which a removable sleeve is located.

9 Claims, 2 Drawing Figures

REMOTELY OPERATED PIPE CONNECTOR

FIELD OF THE INVENTION

The present invention relates generally to Graylock type pipe connectors, and more particularly to an apparatus for remotely assembling and disassembling such a connector.

BACKGROUND OF THE INVENTION

Graylock type connectors are well known in the art and have been disclosed in a number of patents, including U.S. Pat. No. 3,403,931 (Crain et al) and U.S. Pat. No. 3,680,188 (Mason et al). Connectors of this type provide a pressure seal which is made by wedging a metal seal ring between two hubs that are in turn held together by two semicircular clamps. Four studs are highly torqued to draw the clamps together to provide a compression seal with the seal ring. Such connectors are ASME code approved as closure mechanisms to seal a pressure containing system such as a pressure vessel consisting principally of a closed length of pipe.

The standard Graylock system for large pressure vessels, however, is not easily assembled or disassembled and is not suitable for remote handling. Clamp alignment, insertion and removal of studs and nuts, and the application of torque to the nut require a manual effort. Large, high pressure connectors are heavy and difficult to assemble or disassemble. Thus, there is a need to provide an apparatus with the capability of assembling and disassembling these connectors remotely.

Various remote controlled devices have also been disclosed in the prior art for connecting a pipe to another structure. Examples of such miscellaneous devices are disclosed in the following U.S. Pat. Nos.: No. 3,754,780 (Pogonowski); No. 3,845,973 (Houot): No. 4,185,856 (McCaskill); and No. 4,191,256 (Croy et al). However, none of these devices are suitable for use with a Graylock type connector.

SUMMARY OF THE INVENTION

In accordance with the present invention, an apparatus for remotely assembling and disassembling a connector between a pipe and a closure for the pipe is provided. The connector is a Graylock type connector which includes an angled flange on the end of the pipe and an angled flange on the end of the connector. Two semicircular collars surround the flanges so that an interior peripheral cam groove rests against both flanges. A nut and bolt means extends through the two collars at each side in order to draw the collars together. A sealing ring is located between the pipe and the closure. This sealing ring is compressed between the pipe and the closure as the camming action of the cam groove on the collar draws the pipe and closure toward one another.

In order to operate such a connector remotely, a base is provided with a receptacle in which the closure is received with the flange of the closure uppermost and horizontally disposed and with the sealing ring resting on the flange. A positioning means is then provided for moving the pipe into position vertically above the closure with the flange of the pipe immediately adjacent and concentric with the flange of the closure. A moving means for each collar is also provided for reciprocally removing each collar horizontally from a position free of the closure to a position such that the interior cam groove contacts the two flanges. Finally, a tensioning means is provided for automatically tightening and loosening the nut and bolt means in each side of the collars to cause the seal ring to be compressed to seal the pipe to the closure and to cause the seal ring to be released from compression.

In the preferred embodiment of the present intention, the moving means for each collar includes a support for the collars, a pair of guides on the base parallel to the movement of the collar, and the guide follower for guiding the support for movement along the guides. Conveniently, the guides are V shaped tracks and the guide followers are wheels with a peripheral V shaped groove to mate with the V shaped track. A hydraulic actuator is also preferably used for each collar which is attached between the support and the base.

In the preferred embodiment, the nut and bolt means also preferably includes an elongate shaft portion at each side of the collars which extends externally of the collars during tensioning. The tensioning means then includes a removable sleeve which is located around each shaft portion between the associated collar and a reaction surface of the nut and bolt means. Thus, by removal of the sleeve, the collars are allowed to slide apart along the nut and bolt means sufficiently for the pipe to clear the collars. Preferably, the sleeve has a C shaped cross section. An arm is attached to the sleeve at one end and to a pivot means at the other end. This pivot means is attached to the base for pivotal movement of the sleeve away from the shaft portion. A stop means for limiting the pivotal movement of the arm and a travel means for allowing the arm to move parallel to the shaft portion are also preferably provided.

It is thus an advantage of the present invention to facilitate assembly and disassembly of a common pressure vessel closure to the extent that remote operation is possible.

It is also an object to the present invention to use a closure mechanism which is ASME code approved and is suitable for pressure rating in excess of those possible with other remote closure devices.

Other features and objects of the present invention are stated in or apparent from a detailed description of a presently preferred embodiment of the invention found hereinbelow.

DETAILED DESCRIPTION OF THE PREFERRED EMBODIMENT

Figure 1:
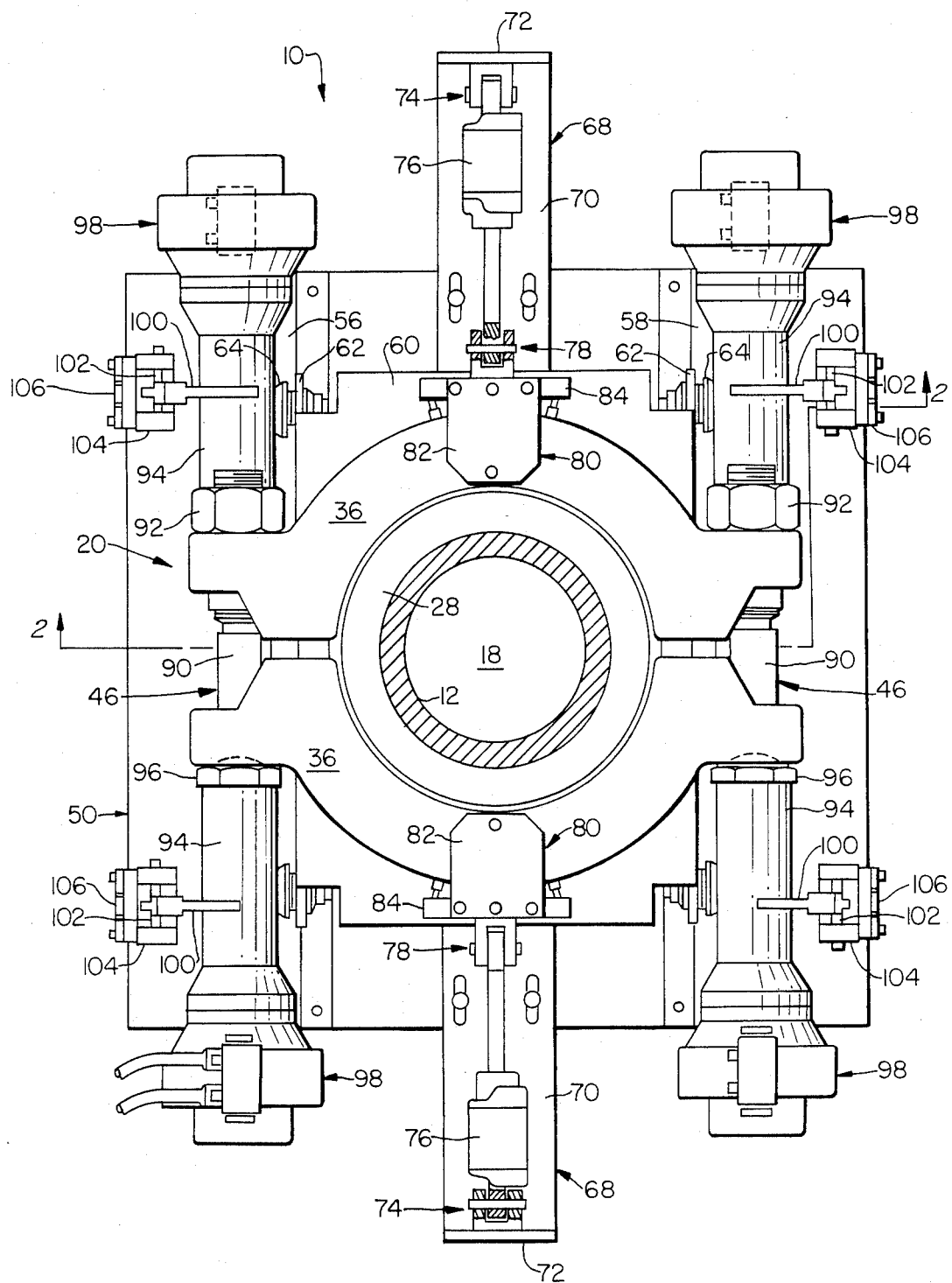
FIG. 1 is a top plan view of a remotely operated pipe connector according to the present invention.
Figure 2:
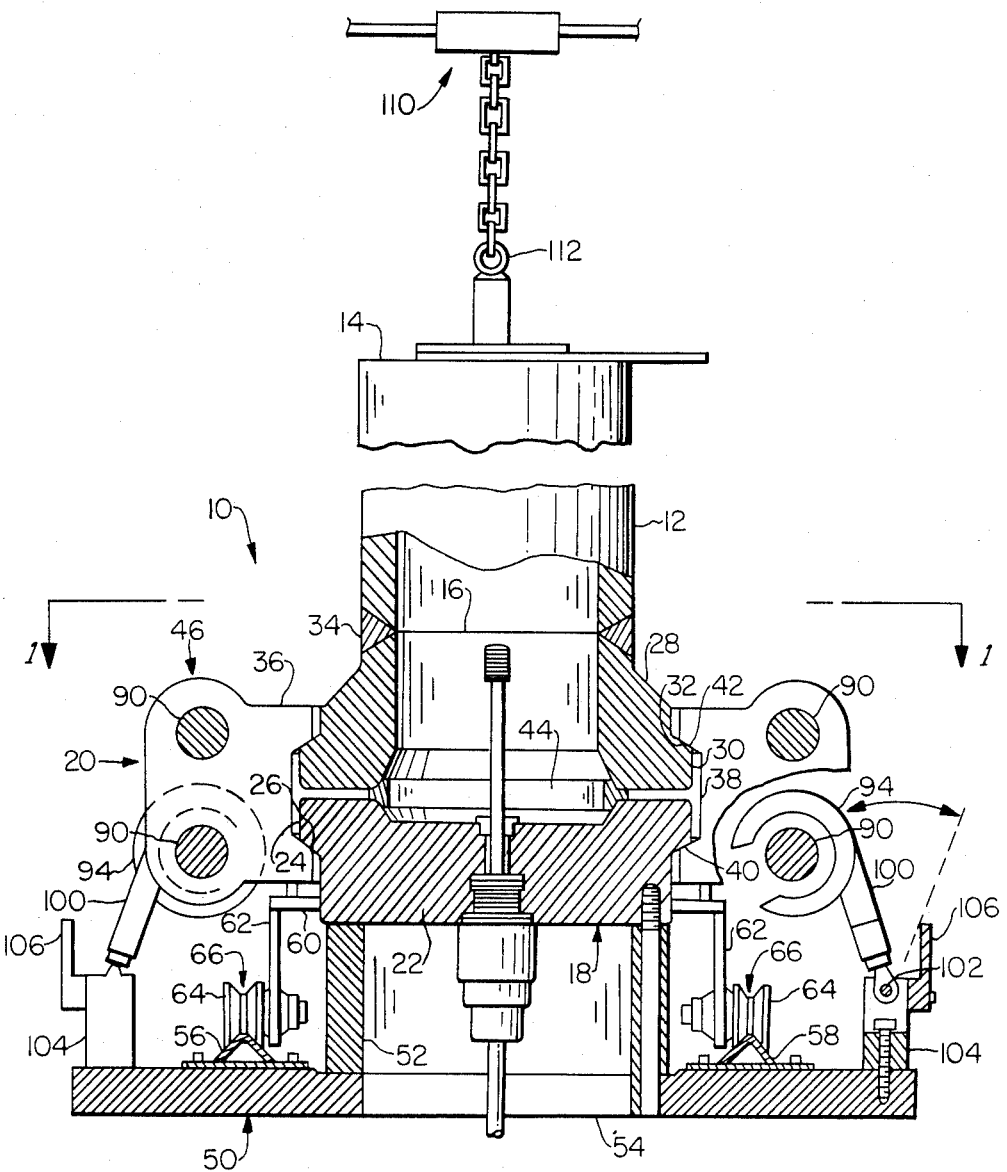
FIG. 2 is a cross sectional elevation view of the remotely operated pipe connector depicted in FIG. 1 taken along the line 2—2.

With reference now to the drawings in which like numerals represent like elements throughout the two views, a presently preferred embodiment of a remotely operated pipe connector 10 is depicted in FIGS. 1 and 2. Pipe connector 10 is used to join a pipe 12 having a suitably closed end 14 and an open end 16 to a closure 18 for open end 16. In order to accomplish this, a Graylock type connector 20 is employed.

Connector 20 comprises a blind hub 22 which includes a suitable flange 24. Flange 24 has an angled camming surface 26 as is well known in the art. Connector 20 also includes a vessel hub 28 having a flange 30 provided with an angled camming surface 32. Conveniently, vessel hub 28 is simply welded to open end 16 of pipe 14 as shown by weld 34.

Connector 20 further includes a pair of semicircular clamping collars 36 having an interior peripheral cam groove 38. As shown in FIG. 2, cam groove 38 includes angled cammed surfaces 40 and 42 which respectively engage camming surfaces 26 and 32 during joining.

Located between blind hub 22 and vessel hub 28 and resting on the interior portions of respective flanges 24 and 30 is a sealing ring 44. Sealing ring 44 is compressed between flanges 24 and 30 to provide a sealing of the joint between blind hub 22 and vessel hub 28. This compressive action is caused by the drawing together of clamping collars 36 in a radial direction relative to pipe 12 which results through the action of camming surfaces 26, 32, 40, and 42 on the axial movement of blind hub 22 and vessel hub 28 toward one another. The drawing together of clamping collars 36 is accomplished through a nut and bolt means 46. These nut and bolt means are tightened to a high torque in order to provide the necessary compressive forces.

Remotely operated pipe connector device 10 is specifically designed to perform the assembling and disassembling operations of connector 20 remotely. Pipe connector device 10 is particularly useful where pipe 12 is a relatively large, high pressure, pressure vessel which is heavy and thus makes the assembly and disassembly of a suitable sized connector 20 quite difficult. Pipe connector device 10 includes a base 50 in which a receptacle 52 is provided. As shown, receptacle 52 is particularly designed to secure closure 18 to base 50 by bolting with flange 24 horizontal and uppermost. Where access is provided to the interior of pipe 12 through closure 18 as shown, base 50 preferably also includes an aperture 54 therethrough.

Mounted on the top surface of base 50 are V shaped tracks 56 and 58. As shown best in FIG. 1, tracks 56 and 58 extend from one side of base 50 to the other. As also shown in FIG. 1, each clamping collar 36 is mounted on a support 60. Each support 60 has a pair of depending walls 62. Suitably mounted to each wall 62 is a pair of wheels 64. Only one wheel 64 of each pair is shown, with the other wheel of the pair located beneath the adjacent clamping collar 36. Each wheel 64 has a V shaped groove 66 along the periphery thereof which rides on an adjacent track 56 or 58. Thus, supports 60 are mounted for horizontal movement relative to base 50.

Also attached to base 50 intermediate tracks 56 and 58 is a bracket 68 associated with each clamping collar 36. Each bracket 68 includes a horizontal plate 70 which is suitably attached to base 50 and a vertical plate 72 located at the far end of horizontal plate 70.

Extending horizontally from vertical plate 72 at the vertical position of the associated clamping collar 36 is a mounting means 74. Mounting means 74 is used to pivotally mount a hydraulic actuator 76 to vertical plate 72 such that hydraulic actuator 76 can pivot about a horizontal axis as shown. The other end of hydraulic actuator 76 is attached to a similar mounting means 78. Mounting means 78 is securely attached to a pusher 80. Pusher 80 includes a bottom plate (not shown), a top plate 82, and a middle plate 84 all of which are mechanically clamped to an associated clamping collar 36. Thus, by actuation of hydraulic actuator 76, an associated clamping collar 36 is appropriately moved along tracks 56 and 58 with support 60.

As mentioned above, a nut and bolt means 46 is provided for drawing clamping collars 36 together. In the present invention, nut and bolt means 46 on each side of clamping collars 36 includes a pair of elongate shafts 90, one on top of the other, which extend through the sides of clamping collars 36. As shown more clearly with respect to the upper elongate shafts 90, a nut 92 is securely threaded on one end of elongate shaft 90 on the outside of the associated clamping collar 36. On the other side of the associated clamping collar, elongate shaft 90 extends through a C shaped sleeve 94. At the end of sleeve 94 adjacent the associated clamping collar 36, a spherical washer 96 is provided which engages a mating surface of clamping collar 36. At the other end of sleeve 94, sleeve 94 engages a hydraulically actuated stud tensioner 98. Stud tensioner 98 is designed to rotate a nut contained therein on the threaded end of elongate shaft 90.

It should be appreciated that sleeve 94 is removable from elongate shaft 90 when elongate shaft 90 is not tensioned. Sleeve 90 is thus pivotally mounted to base 50 by use of an arm 100 which is suitably attached to sleeve 94 as by welding. The lower end of arm 100 is mounted about a pivot shaft 102. The lower end of arm 100 is also horizontally movable along pivot shaft 102 to allow sleeve 94 some horizontal movement as well. Pivot shaft 102 is mounted to base 50 by a suitable bracket 104. Also mounted to bracket 104 is a stop means 106 which engages arm 100 after arm 100 has pivoted sufficiently to move sleeve 94 out of the way of the horizontal movement of clamping collars 36.

In order to bring pipe 12 into position relative to closure 18 mounted on receptacle 52 of base 50, a suitable positioning means is provided. For example, an overhead crane 110 is suitably attached to an eyelet 112 which is secured to closed end 14 of pipe 12. By use of overhead crane 110, pipe 12 is suitably positioned with flange 30 immediately adjacent flange 24 of blind hub 22.

In operation, pipe connector device 10 functions in the following manner. Initially, nut and bolt means 46 is loosened and sleeves 94 have been pivoted away from associated shafts 90 so that clamping collars 36 are pulled back away from blind hub 22. This leaves a large clearance space. The sealing ring 44 is positioned on blind hub 22 adjacent flange 24. With the clerance provided between clamping collars 36, overhead crane 110 or the like is suitably used to position pipe 12 over blind hub 22. Pipe 12 is positioned so that flange 30 of vessel hub 28 is immediately adjacent flange 24 of blind hub 22 and concentric therewith.

Once pipe 12 is in position, hydraulic actuators 76 are actuated remotely in order to move clamping collars 36 toward respective flanges 24 and 30. It should be appreciated that clamping collars 36 move smoothly and horizontally because clamping collars 36 are attached to respective supports 60 which ride on wheels 64 along tracks 56 and 58. Hydraulic actuators 76 move clamping collars 36 into contact with respective flanges 24 and 30. It should be appreciated that as clamping collars 36 move, clamping collars 36 also freely move along elongate shafts 90 adjacent the respective sleeves 94.

At this time, clamping collars 36 are in contact with both blind hub 22 and vessel hub 28 such that cam surfaces 40 and 42 contact, respectively, caming surface 26 and caming surface 32. Next, sleeves 94 are rotated into position by arm 100 relative to pivot shaft 102. In this manner, sleeves 94 are located between the respective side of clamping collars 36 and respective stud tensioners 98.

Once all four sleeves 94 are in position, hydraulic stud tensioners 98 are actuated. Initially, this causes a small longitudinal movement of each sleeve 94 toward respective clamping collars 36 as spherical washer 96 is received in a corresponding concavity in clamping collars 36. It should be appreciated that this longitudinal movement of sleeves 94 is readily accommodated despite the attachment of arm 100 thereto because arm 100 is movable along pivot shaft 102. As the stud tensioners continue to tighten the nut located therein around the end of elongate shaft 90, the adjacent sides of clamping collars 36 are drawn toward one another resulting in the drawing of blind hub 22 and vessel hub 28 toward one another as well. This is caused by the camming action of camming surfaces 26 and 32 relative to cam surfaces 40 and 42. As blind hub 22 and vessel hub 28 are drawn toward one another, sealing ring 44 is compressed to form the high pressure seal between flange 24 and flange 30. It should be appreciated that stud tensioners 98 supply sufficient force to the nut contained therein to achieve a high torque on the nut and the necessary compressive force on sealing ring 44. After this high load is achieved, pipe 12 is ready to be used as a pressure vessel or the like.

After pipe 12 has been used as a pressure vessel or the like, pipe connector device 10 is also used to disconnect pipe 12 from blind nut 22. This is accomplished by reversing the action of stud tensioners 98 to loosen the nuts contained therein and relieve any tension on elongate shafts 90. After this is accomplished, sleeves 94 are moved slightly longitudinally in order to clear spherical washers 96 and pivoted free from elongate shafts 90. Sleeves 94 are finally positioned with arm 100 against stop means 106 to hold sleeves 94 in a position which does not interfere with further movements of clamping collars 36.

Once sleeves 94 are free of elongate shafts 90, hydraulic actuators 76 are actuated to pull clamping collars 36 away from one another. It should be appreciated that hydraulic actuators 76 supply sufficient force to break the seal and to thereafter withdraw clamping collas 36 away from one another as support 60 rides along wheels 64 on tracks 56 and 58, resepctively. Pipe 12 can then be moved as desired by overhead crane 110.

It should be appreciated that the present invention permits the largest Graylock closure system to be used with ease. In addition, it should also be appreciated that the present invention with slight modification to receptacle 52 and base 50 can be used to form a connection between two pipes as well as a connection between a pipe and a closure as described above. It should further be appreciated that the exact positioning of pipe 12 relative to closure 18 is not critical as the sealing ring 44 has tapered surfaces that center the pipe and closure exerting a compressive force on sealing ring 44.

While the present invention has been described with respect to exemplary embodiments thereof, it will be understood by those of ordinary skill in the art that variations and modifications can be effected within the scope and spirit of the invention.

We claim:

1. An apparatus for remotely assembling and disassembling a connector between a pipe and a closure for the pipe, wherein the connector includes an angled flange defining an annular camming surface on the end of the pipe, an angled flange defining an annular camming surface on the closure, two semicircular collars which surround the flanges on the pipe and the closure, each of the collars having annular camming surfaces thereon adapted to contact the annular camming surfaces on the pipe and closure, a nut and bolt means extending through the two collars at each side for drawing the collars together, and an annular sealing ring located between the pipe and closure, the sealing ring being compressed between the pipe and the closure as the camming action of the camming surfaces on the collars against the camming surfaces on the pipe and closure draws the pipe and closure toward one another, the apparatus comprising:

a base, a receptacle on the base, the closure being positioned on the receptacle with the flange of the closure upwardmost and horizontally disposed, and the sealing ring resting on the flange;

a positioning means for moving the pipe into position vertically above the closure with the flange on the end of the pipe immediately adjacent to and the sealing ring resting on the flange of the closure;

a moving means for each collar for reciprocally moving each collar horizontally from a position free of the closure to a position such that the annular camming surfaces on each collar are in contact with the annular camming surfaces on the pipe and closure; and a tensioning means for automatically tightening the nut and bolt means in each side of the collars to draw the collars together and thereby draw the pipe and closure toward one another to cause the seal ring to be compressed between the pipe and closure.

2. An apparatus as claimed in claim 1 wherein each said moving means includes a support for the collar, a pair of guides on said base parallel to the movement of the collar, and a guide follower for guiding said support for movement along said guides.

3. An apparatus as claimed in claim 2 wherein said guides are V shaped tracks and said guide followers are wheels having a peripheral V shaped groove mating with said V shaped track.

4. An apparatus as claimed in claim 2 wherein said moving means further includes a hydraulic actuator for each collar support which is attached to a respective said support at one end and to said base at the other end.

5. An apparatus as claimed in claim 4 wherein said tensioning means includes a hydraulic stud tensioner.

6. An apparatus as claimed in claim 1 wherein the nut and bolts means includes an elongate shaft portion which extends externally of the collars during tensioning of the nut and bolt means to cause compression of the seal ring; and wherein the tensioning means includes a removable sleeve which is located around the shaft portion between the associated collar and a reaction surface of the nut and bolt means whereby removal of said sleeve allows the collars to slide apart along the nut and bolt means sufficiently for the pipe to clear the collars.

7. An apparatus as claimed in claim 6 wherein said sleeve has a C shaped cross section; and wherein said tensioning means further includes an arm which is attached to the collar at one end and a pivot means for pivotally mounting the other end of said arm to said base for pivotal movement away from said shaft portion.

8. An apparatus as claimed in claim 7 wherein said pivot means further includes a stop means for limiting the pivotal movement of said arm to an acute angle.

9. An apparatus as claimed in claim 7 wherein said pivot means further includes a travel means for freely allowing said arm and said sleeve to travel parallel to said shaft portion.

* * * * *